United States Patent [19]

Federmann et al.

[11] Patent Number: 4,900,920

[45] Date of Patent: Feb. 13, 1990

[54] DEVICE FOR AND METHOD OF MEASURING MINUTE ELONGATIONS BY MEANS OF LIGHT WAVE CONDUCTOR SENSORS

[75] Inventors: Helmut Federmann, Bergisch Gladbach; Friedrich K. Levacher, Brauweiler; Georg Noack, Bergisch Gladbach; Anton Kraus, Overath, all of Fed. Rep. of Germany

[73] Assignee: Felten & Guilleaume Energietechnik Aktiengesellschaft, Cologne, Fed. Rep. of Germany

[21] Appl. No.: 116,032

[22] Filed: Nov. 2, 1987

[30] Foreign Application Priority Data

Nov. 10, 1986 [DE] Fed. Rep. of Germany ....... 3638345

[51] Int. Cl.⁴ .............................................. H01J 5/16
[52] U.S. Cl. ................................. 250/227; 250/231 R
[58] Field of Search ................... 250/227, 225, 231 R; 73/700, 800; 356/364, 368

[56] References Cited

U.S. PATENT DOCUMENTS

| | | | |
|---|---|---|---|
| 4,269,506 | 5/1981 | Johnson et al. | 356/5 |
| 4,495,411 | 1/1985 | Rashleigh | 250/222 |
| 4,659,923 | 4/1987 | Hicks, Jr. | 250/231 R |
| 4,671,659 | 6/1987 | Rempt et al. | 356/345 |

FOREIGN PATENT DOCUMENTS 8212823 8/1982 Fed. Rep. of Germany .
3305234 2/1986 Fed. Rep. of Germany .
3526966 5/1986 Fed. Rep. of Germany .

*Primary Examiner*—David C. Nelms
*Attorney, Agent, or Firm*—Michael J. Striker

[57] ABSTRACT

A device for measuring minute elongations of a light wave conductor is constructed as a light wave conductor-type sensing unit assembled of a series connection of a polarizer, a light coupler, a single polarization preserving, doubly refracting monomode light wave conductor enclosed in an elliptical sheathing and an analyzer. A light beam emitted from a laser diode is coupled via a light wave conducting correction cable to the polarizer and upon passage through the sensing unit is coupled via the light wave conducting connection cable to an optoelectric receiver and the electrical signals are evaluated in an electronic circuit. Changes in phase difference of the exiting light wave resulting from the minute changes in length of the light wave conductor are evaluated and scaled as geometric length units.

9 Claims, 2 Drawing Sheets

DEVICE FOR AND METHOD OF MEASURING MINUTE ELONGATIONS BY MEANS OF LIGHT WAVE CONDUCTOR SENSORS

BACKGROUND OF THE INVENTION

The present invention relates to a device for measuring minute elongations by means of a light wave conductor-sensor and to an arrangement of such a device or structural parts whose elongations are to be monitored.

Light wave conductors (LWC), which term is equivalent to "sheathed optical fibers" have been already formed into and installed in various sensors. One of the most abundant groups of such sensors includes LWC-sensors for mechanical forces (such as tension-, stress-, or compression-, bending- and torsional forces), which make themselves apparent through changes in length (such as elongation, compressing strain or buckling, bending and twisting stress). The indication of such changes in length is the corresponding change in the light damping.

A prior art LWC-sensor for tension forces and its application for monitoring a bridge structure of prestressed concrete is described in German application DE-C2-33 05 234. In this known embodiment a light wave conductor is embedded in a tension proof wire of a fiber reinforced resin structure so that the wire can be monitored as to its tension, breakage or bending. For this purpose the LWC is enveloped in layer of synthetic material of a non-homogeneous structure; the LWC, the intermediate layer and the wire are mechanically firmly connected one to each other over the entire length thereof and the LWC is provided on both ends thereof with connectors for a light passage testing apparatus. The sensivity of this LWC tension sensor is further increased by winding at least one coil of a metal wire (steel wire) or of a glass fiber around the LWC to provide the non-homogeneous intermediate layer (DE-A1-35 26 966).

From the multitude of the different known LWC sensors only the following types will be mentioned; there are LWC sensors for small radioactive radiation doses whereby the light damping is an indication of the dose (DE-U1-82 18 823); and LWC-sensors for the electric current intensity whereby the Faraday effect is utilized as an indicator. For example, known is an optoelectronic current converter for measuring current in a high voltage cable which operates with Faraday effect in a monomode-LWC (Z. etz. volume 106 1985, 1160). Due to the Faraday effect the polarization plane or linear polarized light propagating (in the monomode-LWC) in the direction of magnetic field lines is rotated by the action of the applied magnetic field. To determine from the Faraday effect the current values, the LWC-sensor is coupled at one end thereof to a polarizer and a light source and at the other end thereof to an analyzer and an evaluation electronic.

SUMMARY OF THE INVENTION

The present invention belongs to the group of LWC-sensors for mechanical forces and its objective is to provide such a LWC-sensor which is capable of sensing the minimum elongations and is designed such that in connection with opto-electronic light emitting and light receiving devices detects deformations in the range of microns.

Another objective of this invention is to provide an arrangement of such LWC-sensors which is applicable for measuring elongations in structural parts.

In keeping with these objects and others which will become apparent hereafter, one feature of this invention resides, in a device for measuring minute elongations by means of a light wave conductor, in the provision of a polarization preserving, double refracting monomode light wave conductor which in order to create a LWC-phase sensor, is series connected at one end thereof with a polarizer and a light coupling and at the other end with an analyzer. A light beam from a light source is conducted into the polarizer and introduced through the coupler as a linear polarized light whose phase difference undergoes changes in response to changes in length of the light wave conductor. These phase difference changes are detected in a light receiver and evaluated in an electronic evaluation circuit.

The light wave conductor in the phase sensor of this invention has a particular structure for achieving a configuration double refraction. For example, the latter effect is achieved by enclosing a light wave conducting core (an optical fiber) into an elliptical sheathing or jacket which causes permanent anisotropic mechanical stress in the fiber. Alternatively, it is possible to enclose a light wave conductive core of elliptical cross-section into a round sheathing or jacket.

In still another modification, a round light wave conducting core is enclosed in an optically anisotropic jacket in such a manner that the refraction index of the jacket is different in two mutually perpendicular axes.

In a preferred embodiment of this invention, the light emitter is a laser or a laser diode and the light receiver is a photodiode; the electronic evaluation circuit has an input including a computer connected to the photodiode and an output part including a control for the laser.

In order to create an arrangement for continuous monitoring critical deformations and structural damages of construction parts of metal and synthetic compounds, the LWC-phase sensor is permanently and mechanically rigidly connected to the construction part or in the case of fiber reinforced structural parts of synthetic material is integrally embedded in the laminated structures. In this manner load deflections particularly of component parts for e.g. of an airplane, a machine tool or a bridge construction can be continuously monitored.

In another preferred embodiment of a plurality of LWC-phase sensors of this invention are arranged in those zones of component parts of an airplane which are susceptible to breakage and are connected by a light wave conducting cable to a remote optoelectronic light emitter and light receiver and its electronic evaluation apparatus.

The method of measuring minute elongations of a light wave conductor thus resides in the steps of introducing a linear polarized light into a polarization preserving, doubly refracing light wave conductor in which the passing light wave is shifted about a phase difference d, detecting a change of the phase difference caused by a change in length of LWC-sensor by an optoelectric evaluation apparatus which evaluates the change as a measure of the geometric elongation. In a preferred arrangement of the LWC-sensor the coupler introduces the polarized light at an angle of 45° relative to the optical axis of the light wave conductor.

As mentioned before a substantial advantage of the invention is the fact that the LWC-phase sensor in cooperation with the optoelectronic light emitting, light receiving and electrical signals evaluating devices results in a highly sensitive device capable of detecting minimum elongations so that deformations in the micron range can be detected. As a consequence, the invention is suitable particularly in measuring minute elongations such as load deflections of supporting struts or beams.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
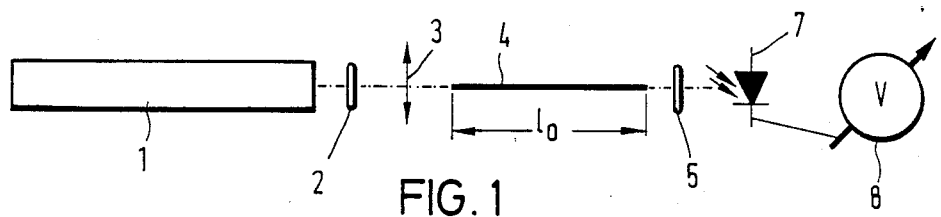
FIG. 1 is a schematic representation of a measuring device including a light wave conductor-phase sensor of this invention.

In the drawings, reference numeral 1 indicates a light emitter (laser or a laser diode), 2 refers to a polarizer, 3 to a polarized light coupler, 4 denotes a polarization preserving, doubly refracting monomode-LWC, 4a indicates the light wave conductor 4 stripped of its sheath or jacket (an optical fiber), 5 refers to a polarized light analyzer, 6 indicates a LWC-phase sensor, 7 denotes a light receiver (a photodiode), 8 refers to an indicator, 9 to a computer (a data-processor), 10 to a control circuit for the light emitter, 11 indicates an evaluation device, 12 indicates a monomode light wave conducting connection cable, and 13 refers to a tail of an airplane provided with a monitoring arrangement including a plurality of LWC-phase sensors.

(a) The Device

Figure 4:
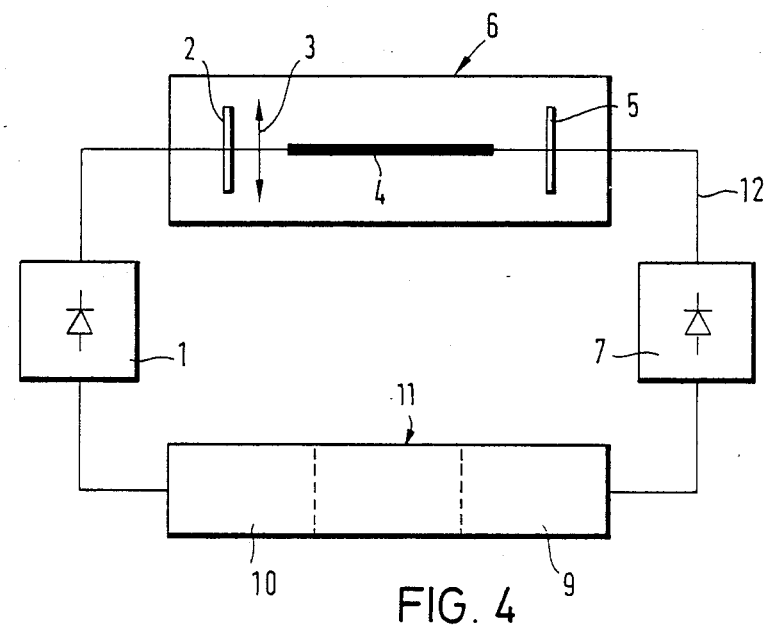
FIG. 4 is a block circuit diagram of an elongation monitoring system employing a LWC-phase sensor of this invention.

As shown in FIGS. 1 and 4, the device of this invention includes a polarization preserving, doubly refracting monomode light wave conductor 4 as an element for measuring minute elongations. The monomode LWC of this type has for example a round light conducting core provided with an elliptical sheathing or jacket which introduces a permanent anisotropic mechanical stress into the core. The input end of the LWC 4 is coupled via a coupler 3 to a polarizer 2 and the other end to an analyzer 5 such that the elements 2 through 5 form an LWC-phase sensor 6. A light emitter 1 is coupled to the input end of the phase sensor 6 and a light receiver 7 to the output end. A monomode light wave conduit or cable 12 serves as a connector between the phase sensor 6 and the light emitter and receiver.

In this example, the light emitter 1 is a laser or a laser diode and light receiver 7 is a photodiode. An evaluation circuit 11 which is connected to the output of photodiode 7 has at its input a computer 9 and at its output a control device 10 for the light emitter.

(b) Operation

Figure 2:
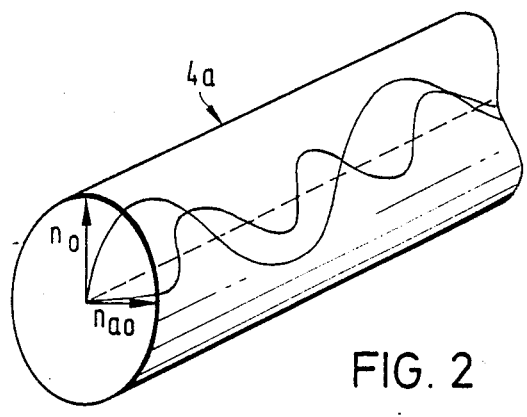
FIG. 2 is a perspective view of a cut-away part of a sheathed monomode-light wave conductor having a double refracting configuration.

The operation of the LWC-phase sensor of this invention will be explained with reference to FIGS. 2 and 3. As mentioned before, the optical elongation sensor utilizes a special type of light wave conductor, namely a polarization preserving, doubly refracting monomode LWC. In manufacturing such a special type of LWC, an elliptical jacket is applied on a round core (an optical fiber) such as to achieve a permanent anisotropic (direction dependent) mechanical stress.

Due to the anisotropic stress the light wave conductor becomes doubly refracting, that means the conducted light wave is split into two component waves. The two main axes of the ellipsis correspond to the optical axes directed perpendicularly to the LWC-axis and being fixedly oriented in space and having respective refraction indices $n_o$ and $n_{ao}$. The optical anisotropy and double refraction mean that the speed of the light propagation depends in characteristic manner on the refraction index of the glass. The optical axes characterize the directions of polarization for which the differences of refraction indices $n_0 - n_{ao}$ is maximum.

Linear polarized light during the passage through the light wave conductor is shifted by a phase difference d. The propagation of linear polarized light in the doubly refracting LWC having the beforedescribed position of optical axes can be described as an incident wave represented through the superposition of two component waves whose polarization directions coincide with respective optical axes. After the passage through the LWC the two component waves are again superposed whereby the phase difference d is to be considered. Accordingly, different forms of polarization (linear, elliptical, circular) of the light transmitted through the LWC occur and an optoelectronic analysis of the polarization state permits the determination of the phase difference d.

If the linear polarized light is coupled at 45° relative to the optical axis of the LWC at the input of the latter then at the output of the LWC a signal having intensity I is received behind a polarization filter. The intensity of the signal can be expressed by the function $$I = I_o(1 + \cos d)$$

wherein, $I_o$ is the intensity of the optical signal at the input of the LWC phase sensor and d is the phase difference according to the formula $$d = (2/\lambda) \cdot (n_o - n_{ao}) \cdot l_o$$

with the refraction indices difference $n_o - n_{ao} = c \cdot s$, and
 $\lambda$ = the wavelength of the coupled in light,
 c = Brewster constant of the core material,
 s = mechanical stress, and
 $l_o$ = length of the LWC.

Figure 3:
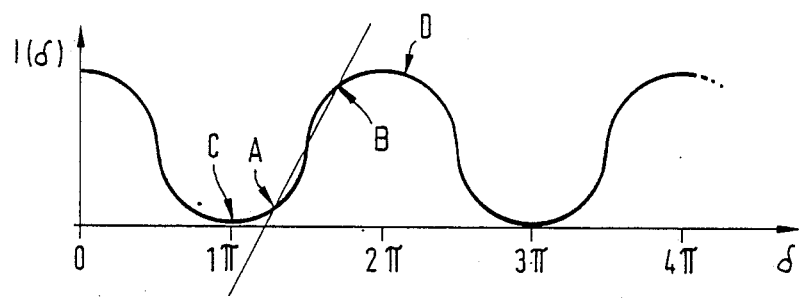
FIG. 3 is a plot diagram of a light wave signal at the output of the phase-sensor of this invention.

FIG. 3 illustrates the graphical representation of the function I.

Inasmuch as the refraction indeces difference depends, as shown above, on the mechanical stress only, a change of the phase difference $\Delta d$ depends only on the change of the length $\Delta l_o$ according to the formula $$\Delta d = (2\pi/\lambda) \cdot K \cdot \Delta l_o$$

wherein K=is optomechanical constant of the LWC.

Consequently it results that from the phase difference change of the light coupled into the LWC-phase sensor the length change of the light wave conductor LWC can be directly determined.

Accordingly, measurements of the minute elongations (changes in length) are to be carried out in such a manner that linear polarized light is coupled into the polarization preserving and in addition doubly refracting monomode-LWC 4 wherein during the passage the light wave is phase shifted by a phase difference d and, in the case of a change in length of the monomode-LWC 4 the resulting phase difference change $\Delta d$ is detected by the optoelectrical light receiver 7 and evaluated in the evaluation device 11 to provide a measure for the geometric change in length.

Preliminary measurements had shown that a phase difference change $\Delta d = \pi$ is caused by a length change of about 1.5 microns. Consequently, the LWC-phase sensor of this invention is particularly suitable for measuring minute elongations such as load bending of carrying or supporting members.

(c) Measuring Method

With reference to FIG. 3 the measuring method of this invention will be explained in detail. In the course of the preliminary application the sensitivity over the measuring length $l_o$ can be adjusted in such a manner that the linear range A–B on the curve I=f(d) is not exceeded. Under this condition one obtains a proportionality between the measured radiation power and the applied mechanical stress which can be scaled according to Hook's law in length changes and which can be maintained with very simply measuring technique.

In a first realization of this application a length change $\Delta l_o$ of about 5 microns at a measuring length $l_o = 500$ mm was sufficient for passing through the measuring range C–D. Hence, with the matching electronic it was possible to measure elongation with an indication accuracy $\Delta l_o / l_o$ of $10^{-6}$.

The measuring speed at stable operation of the light source depends on the speed of the employed electronic circuit only.

The aforementioned measuring range ascertained during the first application can be doubled when the measuring light is splitted by means of a grid into channels. In this way it is made possible to determine with simple arithmetic the phase difference d modulo $2\pi$ (modul of congruence) with substantially the same accuracy.

Particularly when measuring dynamic processes the interval $2\pi$ can be exceeded. Of course, the measuring speed will be will be lowered but inasmuch as the number of phase shifts by $2\pi$ is ascertained in both directions, that means with correct sign + or −, it is possible to determine also large changes in length through the electronic counting process.

(d) The Advantages of the LWC-phase Sensor

From the proceeding explanation it is evident that the concept of the sensor according to this invention provides a high sensitivity with a large measuring range.

(e) Application

The field of application of the LWC-phase sensor includes a continuous monitoring of critical deformations and structural damages of structural parts of metal and fiber reinforced compounds. For this purpose the LWC-sensor is mechanically firmly and permanently connected with the structural part to be monitored. In the case of structural parts made of fiber reinforced synthetic materials, it is also possible to embed the sensor in the laminate. The LWC-sensors of this invention are suitable particularly for monitoring the load bending of structural parts of airplanes, machine tools or bridge constructions so that the risk of an operational failure is reduced.

Figure 5:
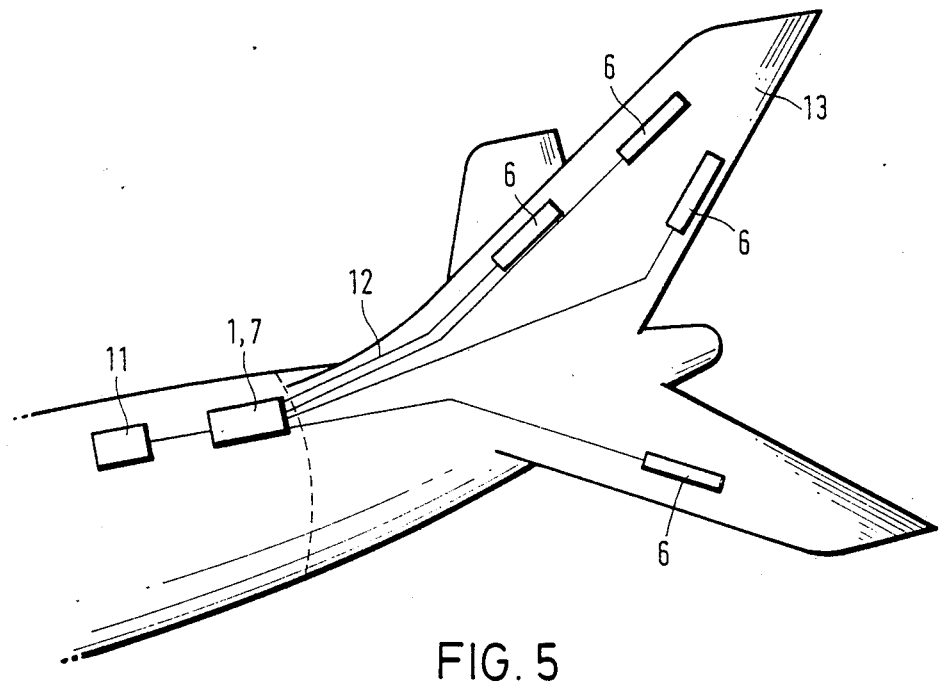
FIG. 5 is a perspective view of an arrangement employing a plurality of LWC-phase sensors to monitor tail of an airplane.

FIG. 5 illustrates a plurality of LWC-phase sensors 6 arranged in the zones of an airplane which are susceptible to breakage, for example at different locations of the tail unit 13 of an airplane wherefrom a monomode light wave conducting connection cable 12 connects the sensors to an optoelectronic transmitter 1 and receiver 7 which together with the electronic evaluation circuit 7 are arranged in a control space within the airplane.

While the invention has been illustrated and described as embodied in specific examples of a light wave conductor phase sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for measuring minute elongations of a light wave conductor, comprising:
    a light emitter;
    a light wave sending unit assembled of a series arrangement of a polarizer, a light coupler, a single light wave conductor of a round cross-section enclosed in an elliptical sheathing which produces a permanent anisotropic mechanical stress in said light wave conductor to provide a polarization preserving, doubly refracting monomode light wave conductor phase sensor, and a light analyzer;
    a light receiver for converting polarized light waves into electrical signals;
    light wave conducting means for coupling said light emitter to said polarizer, and said light receiver to said analyzer; and
    an electronic evaluating circuit for evaluating phase difference change of said electrical signals as a measure of elongation of said single light wave conductor.

2. A device as defined in claim 1, wherein said light emitter is a laser or a laser diode and said light receiver is a photo diode, and said electronic evaluating circuit includes a computer for processing said electrical signals and a control for controlling said light emitter.

3. An arrangement of at least one device according to claim 1 for continuously monitoring critical deformations and structural damages of structural parts, wherein said light wave conductor type sensing unit is permanently and mechanically rigidly secured to a structural part to be monitored, said light emitter and receiver together with said electronic evaluation circuit being arranged at a remote location and connected to said sensing unit by a light wave conducting connection cable.

4. An arrangement as defined in claim 3, wherein said component part being monitored is made of fiber reinforced laminated compound of synthetic material and said sensing unit is embedded in a laminar layer of said material.

5. An arrangement as defined in claim 3, wherein the structural part to be monitored is part of an airplane, of a machine tool or of a bridge structure.

6. An arrangement as defined in claim 3, comprising a plurality of said sensing units secured to breakage susceptible zones of an airplane and connected via said light wave conducting connection cable to said light emitter and said light receiver arranged in a control space within said airplane.

7. A method of measuring minute elongations of a light wave conductor, comprising the steps of feeding linear polarized light into a polarization preserving, doubly refracting light wave conductor wherein the light wave is shifted by a phase difference d, detecting the light wave exiting from the light wave conductor by an optoelectronic evaluation device wherein a phase difference change resulting from a change of the length of said light wave conductor is evaluated and employed as a measure for the geometric change in length.

8. A method as defined in claim 7, wherein the polarized light is fed into said light wave conductor at an angle of 45° relative to the optical axis of said light wave conductor.

9. A method as defined in claim 7, wherein the number of phase shifts by $2\pi$ is detected in both directions in order to ascertain the sign of the shifting in order to increase the range of the length measurement.

* * * * *